United States Patent
Katoh et al.

[11] Patent Number: 6,096,970
[45] Date of Patent: Aug. 1, 2000

[54] CLAMP FOR OVERHEAD LINE HAVING EXPANSION MEANS AND CAM MEANS

[75] Inventors: Jun Katoh; Naoshi Kikuchi; Tomoyuki Watanabe; Takaharu Mitsuhashi, all of Tokyo; Yoshitake Shibata; Kazuhiro Nakamura, both of Nagoya, all of Japan

[73] Assignees: The Furukawa Electric Co., Ltd., Tokyo; Chubu Electric Power Company, Inc., Nagoya, both of Japan

[21] Appl. No.: 08/707,396

[22] Filed: Sep. 4, 1996

[30] Foreign Application Priority Data

Sep. 5, 1995 [JP] Japan .................................. 7-228076
Dec. 7, 1995 [JP] Japan .................................. 7-319045
Jul. 23, 1996 [JP] Japan .................................. 8-193306

[51] Int. Cl.$^7$ .................................................. H02G 7/00
[52] U.S. Cl. ........................................ 174/40 CC; 174/43
[58] Field of Search ........................... 174/40 CC, 40 R, 174/43, 44, 45 TD, 40 TD, 70 A; 24/516; 248/74.1, 65, 316.5; 29/253, 434

[56] References Cited

U.S. PATENT DOCUMENTS

| | | | |
|---|---|---|---|
| 68,304 | 8/1867 | Morse ................................ | 24/134 R |
| 499,933 | 6/1893 | Phillips ................................ | 280/176 |
| 549,774 | 11/1895 | Forst .................................... | 138/99 |
| 2,258,508 | 10/1941 | Kerchner ............................ | 174/136 |
| 3,161,721 | 12/1964 | Torr .................................... | 174/40 R |
| 3,963,855 | 6/1976 | Hawkins et al. ................... | 174/40 R |
| 4,445,657 | 5/1984 | Breckenridge ..................... | 248/73 |
| 4,485,530 | 12/1984 | Begley et al. ...................... | 24/270 |

FOREIGN PATENT DOCUMENTS 1945344  3/1971  Germany ................................ 29/253

Primary Examiner—Kristine Kincaid
Assistant Examiner—Kamand Cuneo
Attorney, Agent, or Firm—Nikaido, Marmelstein, Murray & Oram LLP

[57] ABSTRACT

A clamp for an overhead line including a clamp body in which a first gripping groove for gripping the overhead line is formed; a clamp cap in which a second gripping groove for gripping the overhead line is formed and which is pivotably attached to the clamp body via a hinge unit; a fastening unit for fastening the clamp body and clamp cap in a manner enabling free opening and closing so that the overhead line is affixed between the first and second gripping grooves so as to be unable to move in an axial direction at the pivot position of the final fastening state; and an expansion unit for causing the clamp cap to stop at a position where it is forcibly kept open by a predetermined clearance from the clamp body against a fastening force given by the fastening unit so that the clamp body and the clamp cap are not located at the pivot position of the final fastening state and in addition so that a clearance is formed between the first and second gripping grooves and the overhead line and a method for attachment of the same.

10 Claims, 19 Drawing Sheets

FIG. IA
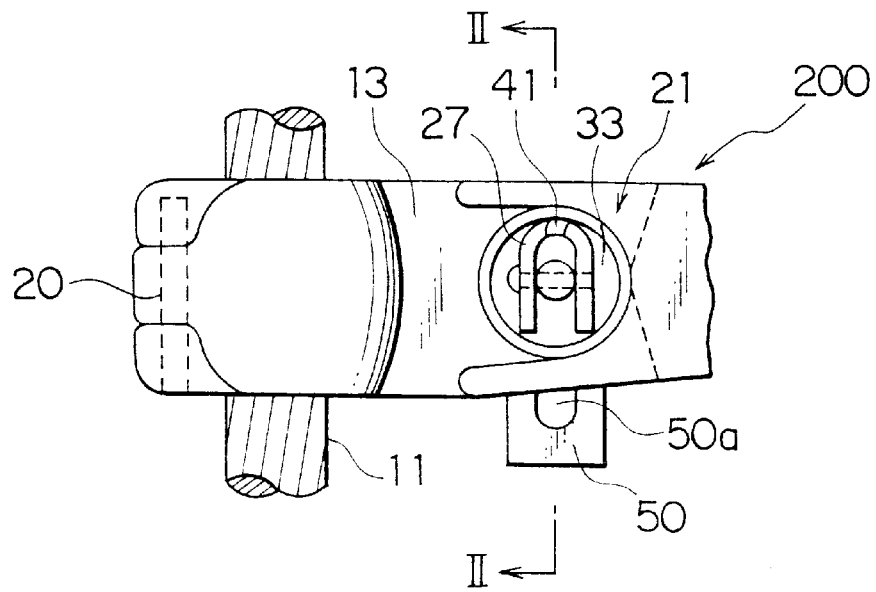
FIG. IB
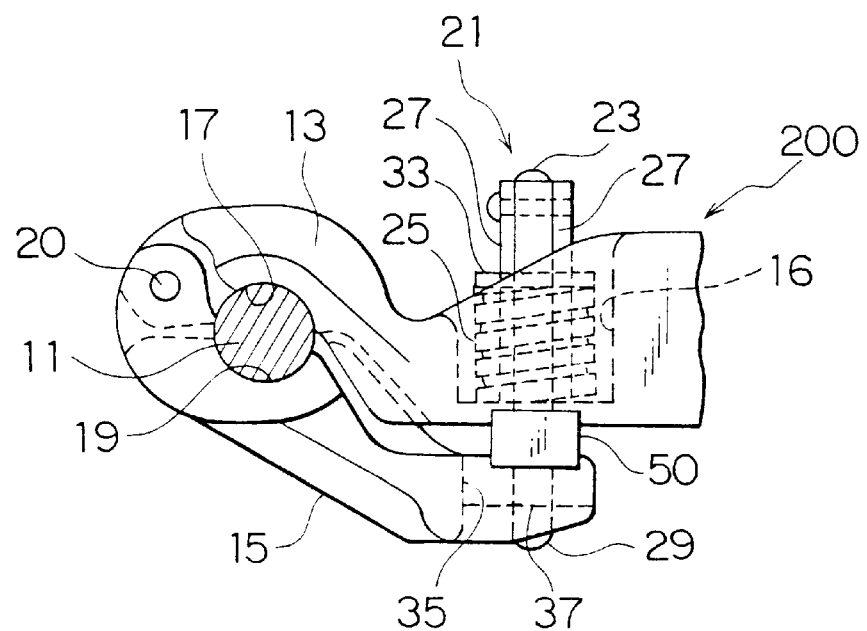

CLAMP FOR OVERHEAD LINE HAVING EXPANSION MEANS AND CAM MEANS

BACKGROUND OF THE INVENTION

1. Field of the Invention

The present invention relates to a clamp for gripping an overhead line and a method of attaching that clamp to an overhead line.

2. Description of the Related Art

In general, an overhead line (overhead transmission line, overhead ground line, etc.) is provided with spacers, twist-preventing dampers, a inter-phase spacers, etc. attached by conductor-use clamps.

There are a variety of constructions of conductor clamps. Among them, there is a conductor clamp comprised of a clamp body and a clamp cap fastened by utilizing the compressive resilience of an elastic body.

The work of attaching a conductor clamp, a however, is work on an unsteady conductor, so there is a problem of a poor efficiency in the work. Further, a large number of the conductor clamps have to be attached to each transmission line. In particular, the spacers used in a multi-conductor transmission line comprising four or more conductors requires four or more conductor clamps—the same as the number of the conductors—for one spacer. Accordingly, there was a problem in that a long time was required for the attachment work. Further, since the number of the clamps was large, there was a possibility of one or more clamps forgetting to be fastened.

SUMMARY OF THE INVENTION

An object of the present invention is to provide a clamp for an overhead line which can prevent fastening of the clamp from being forgotten and, at the same time, enables easy attachment of the clamp even under unsteady conditions and a method of attachment thereof.

So as to achieve the above object, according to a first aspect of the present invention, there is provided a clamp for an overhead line having a clamp body in which a first gripping groove for gripping the overhead line is formed; a clamp cap in which a second gripping groove for gripping the overhead line is formed and which is pivotably attached to the clamp body via a hinge means; a fastening means for fastening the clamp body and clamp cap in a manner enabling free opening and closing so that the overhead line is affixed between the first and second gripping grooves so as to be unable to move in an axial direction at the pivot position of the final fastening state; and an expansion means for causing the clamp cap to stop at a position where it is forcibly kept open by a predetermined clearance from the clamp body against a fastening force given by the fastening means so that the clamp body and the clamp cap are not located at the pivot position of the final fastening state and in addition so that a clearance is formed between the first and second gripping grooves and the overhead line.

Preferably, the fastening means has a fastening rod for connecting the clamp body and clamp cap in a manner enabling free opening and closing; an elastic member for imparting an elastic force in a direction for fastening the clamp body and clamp cap; and a cam means for switching between a state where the fastening force by the elastic member acts in a direction for fastening the clamp body and clamp cap and a state where that fastening force is released.

Preferably, the expansion means is inserted into the clearance between the clamp body and the clamp cap in a state where the fastening force by the elastic member acts in the direction for fastening the clamp body and clamp cap.

The expansion means is for example a wedge.

According to a second aspect of the present invention, there is provided a clamp for an overhead line having a clamp body in which a first gripping groove for gripping the overhead line is formed; a clamp cap in which a second gripping groove for gripping the overhead line is formed and which is pivotably attached to the clamp body via a hinge means; a fastening means for fastening the clamp body and clamp cap in a manner enabling free opening and closing so that the overhead line is affixed between the first and second gripping grooves so as to be unable to move in an axial direction at the pivot position of the final fastening state; and a stopper means for temporarily holding the clamp cap with respect to the clamp body at a temporary stopping pivot position so that the clamp body and clamp cap are not located at the pivot position of the final fastening state and in addition so that a clearance is formed between the first and second gripping grooves and the overhead line.

Preferably, the fastening means has a fastening rod for connecting the clamp body and clamp cap in a manner enabling free opening and closing; an elastic member for imparting an elastic force in the direction for fastening the clamp body and clamp cap; and a cam means for switching between the state where the fastening force given by the elastic member acts in the direction for fastening the clamp body and clamp cap and the state where that fastening force is released.

Preferably the clamp is configured so that the stopper means is attached to the outer periphery of the fastening rod; a groove in which the stopper means can be engaged so that it cannot move in the axial direction is formed at the outer periphery of the fastening rod; and the clamp body and clamp cap, are affixed at the pivot position of the final fastening state in a state where the stopper means is engaged with the groove. In this case, the stopper means is constituted by for example a spring plate having a U-shape.

Also the clamp can be configured so that the stopper means has a stopper member body attached to the outer periphery of the fastening rod, a wedge piece attached to the inner periphery of the stopper member body, and a spring for pressing this wedge piece in the axial direction of the fastening rod; the stopper member body is attached to the outer periphery of the fastening rod so that it can move in the first axial direction and in addition cannot move in a second axial direction which is a reverse direction to the first direction without any tool; and the stopper member body is moved in the first axial direction along the outer periphery of the fastening rod so that the clamp body and clamp cap are affixed at the pivot position of the final fastening state.

Also the clamp can be configured so that the stopper means has a stopper member provided in the clamp body or clamp cap and so that the stopper member engages with an engagement piece provided on the outer periphery of the fastening rod in a manner allowing the clamp body and clamp cap to pivot relative to each other along the fastening rod in the first direction giving the pivot position of the final fastening state but limiting the relative pivoting in the second direction which is the reverse direction to the first direction and the clamp body and clamp cap are affixed to give the pivot position of the final fastening state.

Also, the clamp may be configured so that the stopper means has a stopper piece provided so that a spring force is given to the fastening rod in a spreading direction; the stopper piece is pulled in when the clamp body and clamp cap are pivoted relative to each other in the first direction giving the pivot position of the final fastening state along the stopper piece in a state where either the clamp body or clamp cap is in contact with the stopper piece of the fastening rod; the stopper piece spreads outward when the clamp body and clamp cap are pivoted relative to each other in the first direction over the stopper piece; and the stopper piece is engaged with the clamp body or the clamp cap and the clamp body and clamp cap are affixed to give the pivot position of the final fastening state. In this case, preferably a temporary stopping groove is formed in the outer surface of the stopper piece.

According to a further aspect of the present invention, there is provided a method for attaching a conductor clamp by fastening a clamp body and a clamp cap for gripping an overhead line by utilizing the compressive resilience of an elastic member, comprising first attaching a clamp body and clamp cap near a steel tower to surround the outer periphery of the overhead line leaving a clearance with the outer periphery of the overhead line and then moving the clamp body and clamp cap in the axial direction along the outer periphery of the overhead line and finally tightly gripping the overhead line by the clamp body and the clamp cap.

According to the method of attachment of a clamp according to the present invention, even if the work is conducted under unsteady conditions, for example, from an aerial cab suspended from an overhead line, it becomes possible to attach the clamp to the overhead line extremely easily and in addition in a short time and also the possibility of forgetting to fasten the clamp is reduced.

Note that, the present invention is not particularly limited to any type of overhead line and may be applied to either an overhead transmission line or overhead ground line. Further, the overhead line is not limited to an electrical conductor. It may also be an optical fiber cable.

BRIEF DESCRIPTION OF THE DRAWINGS

These and other objects and features of the present invention will become clearer from the following description of the preferred embodiments given with reference to the attached drawings, wherein FIG. 1A is a plan view of principal parts of a clamp according to an embodiment of the present invention;

FIG. 1B is a side view of the principal parts;

DESCRIPTION OF THE PREFERRED EMBODIMENTS

Figure 2A:
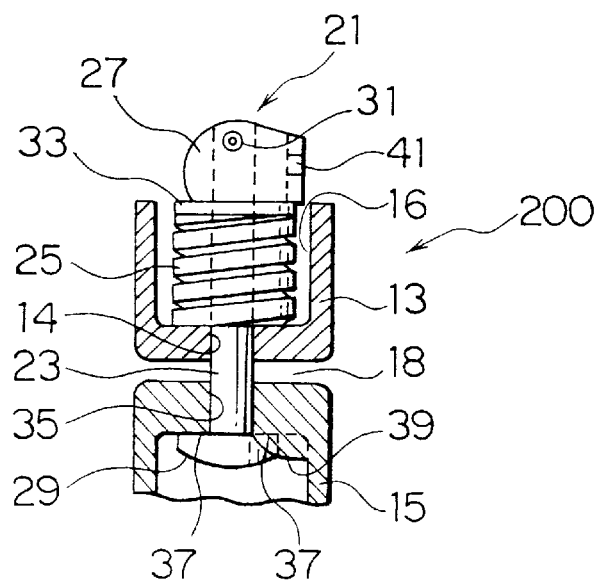
FIG. 2A is a sectional view of the principal parts taken along a line II—II shown in FIG. 1A, but in which the illustration of the wedge-shaped expansion member is omitted.

Below, the present invention will be explained in further detail based on embodiments shown in the drawings.

First Embodiment

Figure 6:
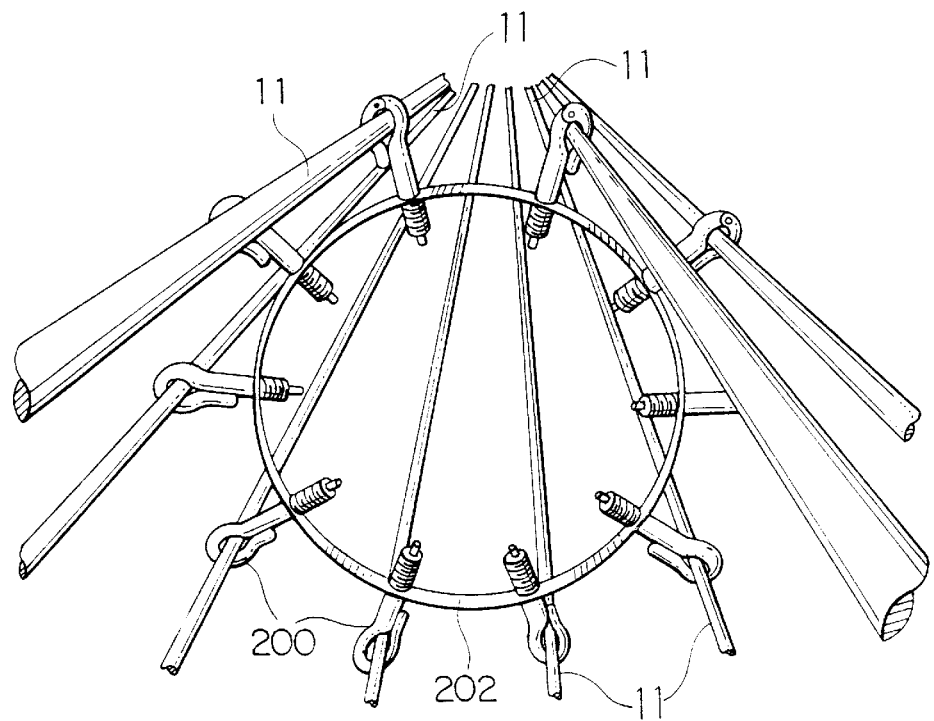
FIG. 6 is a perspective view of the relationship among a spacer, conductor, and clamp.
Figure 7:
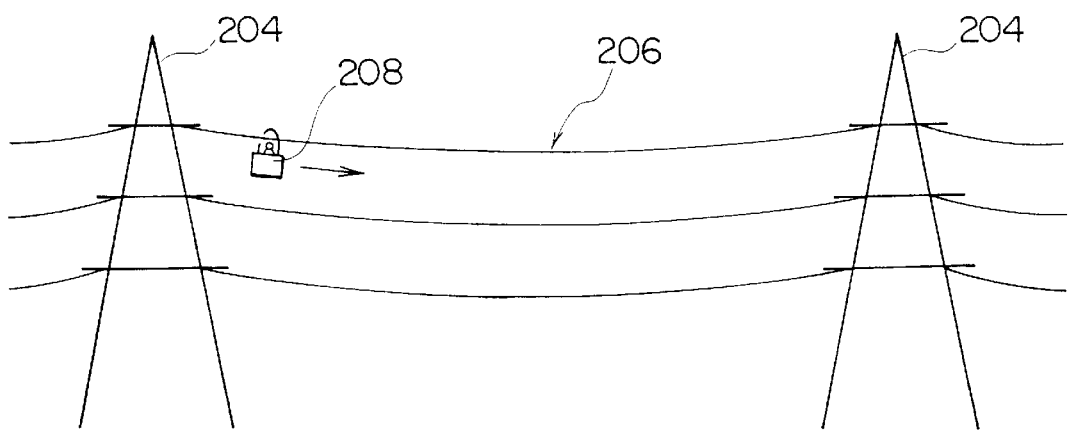
FIG. 7 is schematic view of an example of a steel tower.

A clamp 200 according to the present embodiment is used, as shown in FIGS. 6 and 7, for connecting a spacer 202 and a conductor 11 so that a plurality of conductors 11, serving as overhead lines constituting a multi-conductor transmission line 206 suspended between steel towers 204 and 204, may be arranged at a predetermined distance from each other by such spacers 202. After the multi-conductor transmission line 206 is suspended between the steel towers 204 and 204 shown in FIG. 7, spacers 202 are arranged at a plurality of positions between the steel towers 204 and 204. For that work, the worker climbs on the aerial cab 208, moves the aerial cab 208, and fixes a spacer 202 to each conductor 11 by a clamp 200 at a plurality of positions in the axial direction of the multi-conductor transmission line 206. Accordingly, there has been a demand for improvement of the efficiency of the work for attachment of the clamp 200.

As shown in FIGS. 1A to 2B, the clamp 200 for an overhead line according to the present embodiment includes a clamp body 13 with a front end designed to be affixed to the spacer 202 shown in FIG. 6 etc. and a clamp cap 15 pivotably attached to a base end of this clamp body 13 with a hinge portion 20 serving as the center of pivoting. The clamp body 13 and the clamp cap 15 have conductor gripping grooves 17 and 19 respectively formed near the hinge portion 20. The conductor 11 is gripped between these gripping grooves 17 and 19.

The clamp body 13 and the clamp cap 15 are designed to be able to open and close and fasten the conductor 11 by a fastening mechanism 21 comprised of a fastening rod 23, a coil spring 25, an eccentric cam 27, etc.

Figure 2B:
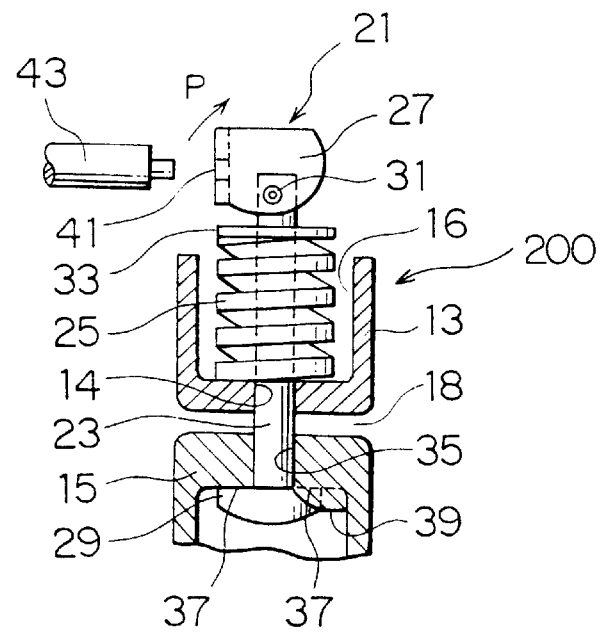
FIG. 2B is a sectional view of the principal parts taken along the line II—II shown in FIG. 1A, but in which the illustration of the wedge-shaped expansion member is omitted and in addition the pivot position of a cam is different from that in FIG. 2A.

On the front end of the clamp cap 15, as shown in FIGS. 2A and 2B, are formed a recess (including an elongated hole) 35 and a step portion 37. The lower end portion of the fastening rod 23 can be inserted into the recess 35. On the lowermost end of the rod 23, a T-shaped engagement portion 29 is formed. This engagement portion 29 can pass through the recess 35 at a predetermined first pivot position (direction in which the longitudinal direction of the engagement portion 29 is substantially at a right angle with respect to the conductor 11). In addition, at a second pivot position about 90 degrees from the first pivot position (direction substantially parallel to the conductor 11), this engagement portion 29 is engaged with the step portion 37 as shown in FIGS. 2A and 2B. Note that, the step portion 37 is formed with a stopper projection 39 so the T-shaped engagement portion 29 stops at the second pivot position.

The upper portion of the rod 23 passes through a through hole 14 of the clamp body 13. At the uppermost portion thereof, the eccentric cam 27 is rotatably mounted by a shaft pin 31. The through hole 14 is formed in a bottom portion of a depression 16 formed in the clamp body 13. Inside of the depression 16 there is attached a coil spring 25 positioned at the outer periphery of the rod 23 between the eccentric cam 27 and the bottom portion of the depression 16. A washer 33 is placed above the coil spring 25.

The eccentric cam 27 is comprised of a U-shaped plate material as shown in FIG. 1A and has a hole 41 for the pivoting operation formed in the bent portion thereof. This eccentric cam 27 pivots about the shaft pin 31 and can freely pivot between a state compressing the coil spring 25 as shown in FIG. 2A and a state of not compressing the coil spring 25 as shown in FIG. 2B. The pivoting operation of this eccentric cam 27 is carried out by inserting the operating rod 43 into the hole 41 and operating the rod 43.

In the clamp 200 according to the present embodiment, as shown in FIG. 2A, in a state where the T-shaped engagement portion 29 of the rod 23 is engaged with the step portion 37 of the cap 15 and the eccentric cam 27 is at the pivot position compressing the coil spring 33, a wedge-shaped expansion member 50 can be attached to the outer periphery of the rod 23 in the clearance 18 between the body 13 and the cap 15 as shown in FIGS. 1A and 1B.

Figure 3A:
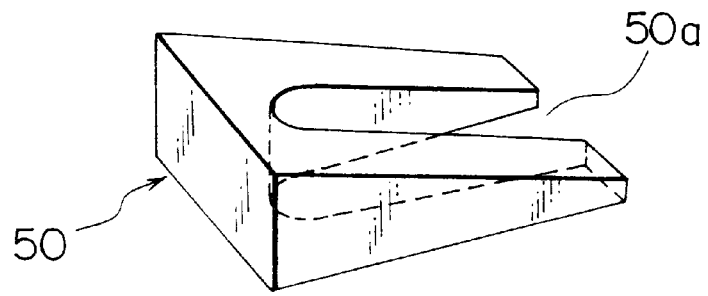
FIGS. 3A to 3C are a perspective view and plan view of examples of the wedge-shaped expansion member.
Figure 3B:
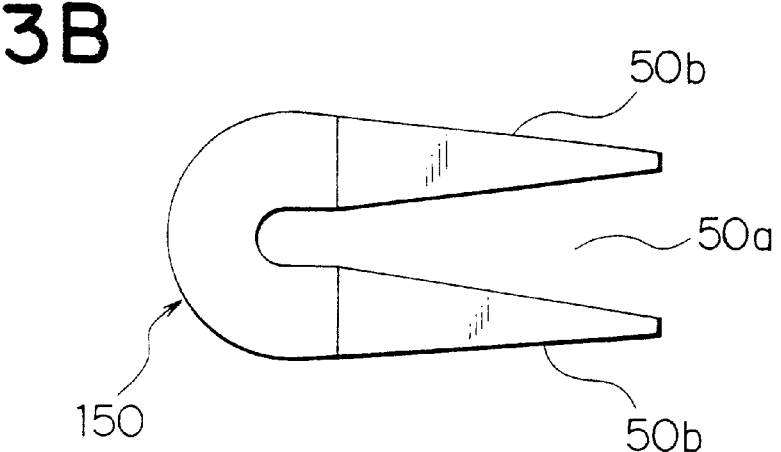
Figure 3C:
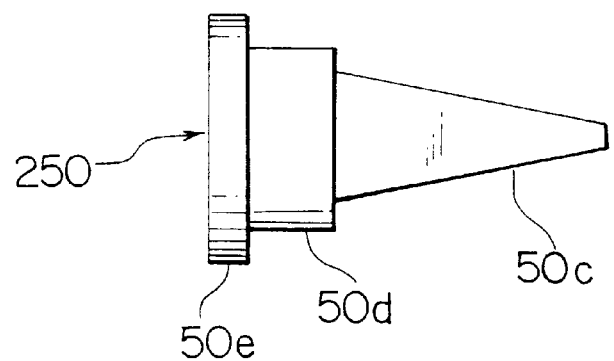

The expansion member 50 has a wedge-like shape with a fastening rod insertion groove 50a at the center portion as shown in FIG. 3A. Note that, as the expansion member, it is also possible to use, as shown in FIG. 3B, a wedge-shaped expansion member 150 comprised of a rod body 50b with two tapered ends 50b bent into a U-shape and, as shown in FIG. 3C, a wedge-shaped expansion member 250 comprised of a successively formed conical portion 50c, a cylindrical portion 50d having a larger outer diameter than the maximum outer diameter of the conical portion 50c, and a flange portion 50e having a larger outer diameter than the outer diameter of the cylindrical portion 50d etc. These expansion members 50, 150, and 250 are made of a metal, hard rubber, hard plastic, etc.

Next, an explanation will be made of the procedure of gripping the conductor 11 by this conductor clamp 200.

First, a clamp body 13 and a clamp cap 15 are attached to each of the conductors 11 constituting the multi-conductor transmission line 206 near the steel tower 204 shown in FIG. 7. For this purpose, first, the eccentric cam 27 is pivoted so that, as shown in FIG. 2A, the coil spring 25 is placed in the noncompressed state, the fastening rod 23 is turned so as to orient the longitudinal direction of the T-shaped engagement portion 29 in the same direction as the longitudinal direction of the elongated hole 35, and the cap 15 is opened from the body 13. Next, the conductor 11 is placed between the body 13 and the cap 15, the clamp cap 15 is closed, and then the fastening rod 23 is rotated by 90 degrees to engage the T-shaped engagement portion 29 with the step portion 37 of the cap 15.

Next, as shown in FIG. 2B, the operating rod 43 is inserted into the hole 41 of the eccentric cam 27 and turned by 180 degrees in the direction indicated by the arrow P.

When this is done, as shown in FIG. 2A, the eccentric cam 27 compresses the coil spring 25. Accordingly, the body 13 and the cap 15 are fastened by the resilience thereof and the conductor 11 is tightly gripped. In this state, the clamp 200 comprising the body 13 and the cap 15 cannot move along the conductor 11.

Next, the clamp body 13 and the clamp cap 15 are spread apart against the compressive force of the coil spring 25. The clamp body 13 and the clamp cap 15 are spread apart by driving the wedge-shaped expansion member 50 between the clamp body 13 and the clamp cap 15.

The operation for driving the expansion member 50 between the clamp body 13 and the clamp cap 15 may be performed manually or by utilizing a machinery such as a hydraulic cylinder, a hydraulic motor, or an electric motor.

By driving the expansion member 50 between the clamp body 13 and the clamp cap 15, the coil spring 25 is compressed and the clamp body 13 and the clamp cap 15 are opened up. This enables the clamp body 13 and the clamp cap 15 to be moved along the conductor 11.

Note that a spacer designed exclusively for use with a six-conductor transmission line, for example, is provided with six conductor clamps. Accordingly, the above operation is carried out for each of the conductor clamps.

After the above work is ended, the clamp body 13 and the clamp cap 15 are moved to a predetermined position along the conductor 11. This work can be easily carried out by having a person riding on the aerial cab 208 shown in FIG. 7 move the spacer 202 etc. shown in FIG. 6.

After the clamp body 13 and the clamp cap 15 have been moved along the conductor 11 to the predetermined position, the work of removing the expansion member 50 from between the clamp body 13 and the clamp cap 15 is carried out.

Figure 4A:
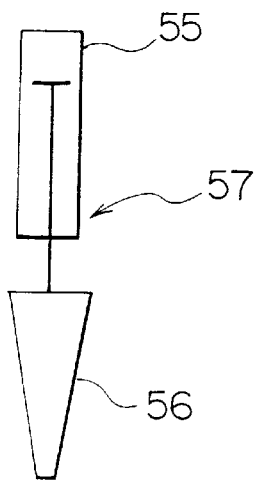
FIGS. 4A, 4B, 5A, and 5B are front views of example of tools for attaching the expansion member.
Figure 4B:
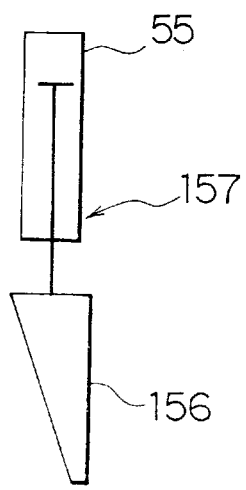

The expansion member 50 may be removed from between the clamp body 13 and the clamp cap 15 by hand, but when it is difficult to remove the same by hand, as shown in FIGS. 4A and 4B, the expansion member 50 can be easily removed by using the withdrawal tools 57 and 157 comprised of withdrawal wedges 56 and 156 attached to a hydraulic cylinder 55. Namely, the withdrawal wedges 56 and 156 are pushed into the fastening rod insertion groove 50a of the expansion member 50 protruding from the clamp body 13 and clamp cap 15 utilizing the force of the hydraulic cylinder 55. When this is done, the expansion member 50 can be easily pulled out.

If these withdrawal tools 57 and 157 are provided for every clamp, they can be simultaneously operated by the hydraulic cylinder 55 and accordingly the work for attaching the clamps can be carried out in a short time.

Figure 5A:
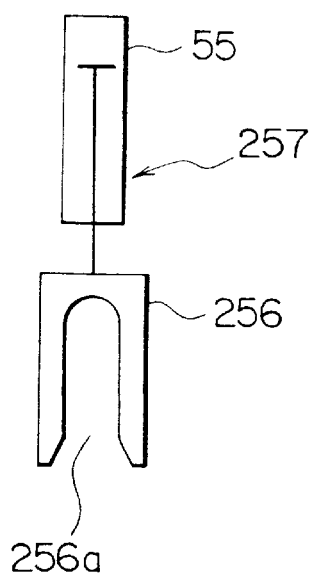
Figure 5B:
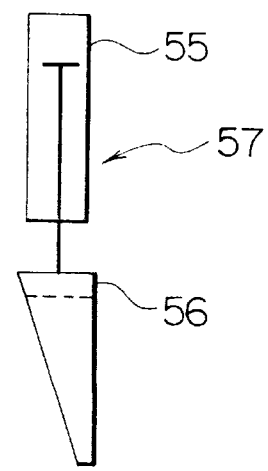

Note that the withdrawal tools, as shown in FIGS. 5A and 5B, can also be constructed with a withdrawal wedge 256 having a cylindrical portion insertion groove 256a connected to the hydraulic cylinder 55. This withdrawal tool 257 is used when an expansion member 250 having the configuration shown in FIG. 3C described before is used. Namely, by inserting the cylindrical portion insertion groove 256a of the withdrawal tool 257 over the outer periphery of the conical portion 50c of the expansion member 250 protruding from the clamp 200 and pushing the tool 257 in by the hydraulic cylinder 55, the expansion member 250 can be withdrawn.

Note that, the structure of the withdrawal tool is not limited to the structure of the above embodiment. For example, an electric motor or hydraulic motor can be used in place of the hydraulic cylinder.

When the expansion member 50 is taken out from between the clamp body 13 and the clamp cap 15, the compressed coil spring 25 extends and the conductor 11 is tightly gripped by the clamp body 13 and the clamp cap 15. At this time, since the coil spring 25 had from the first been compressed to the final compression position, it is not necessary to perform a troublesome operation such as re-compression.

Figure 8:
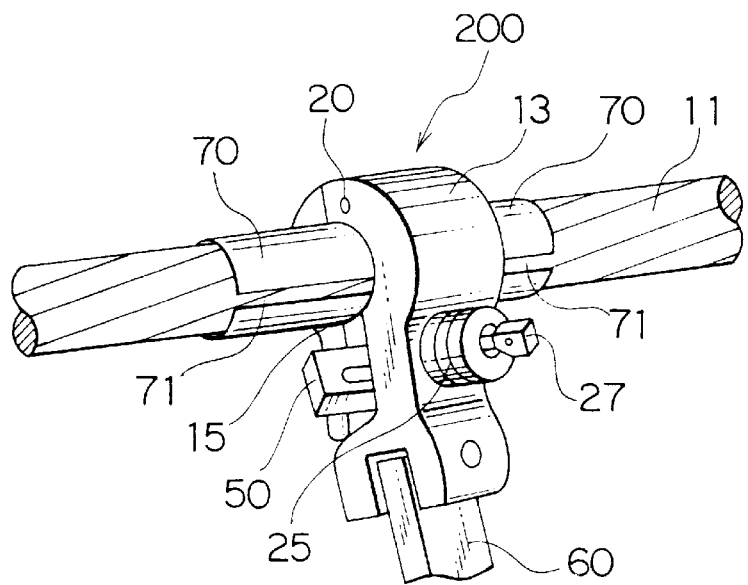
FIG. 8 is a perspective view of a method for attaching a clamp according to another example of the present invention.

FIG. 8 shows a modification of the first embodiment. In this example, a cylindrical body 70 made of a hard plastic having a recess 71 is interposed between the outer periphery of the conductor 11 and the conductor gripping grooves 17 and 19 of the clamp 200.

When interposing a hard plastic cylindrical body 70 in this way, the clamp body 13 and the clamp cap 15 become easy to move on the conductor 11. Note that, in general, a hard plastic will not scratch the conductor 11 even if it is moved along on the conductor 11.

Note that, the conductor clamp used in the present embodiment is not limited to that of the above embodiment. For example, in place of the coil spring 25, it is also possible to use a rubbery elastic body, a plate spring, etc. Further, the means of compressing the elastic body is not particularly limited.

Further, in the above embodiment, the expansion member was inserted between the clamp body and the clamp cap after gripping the conductor by the clamp body and the clamp cap and compressing the elastic body to the final compression position. However, it is also possible to insert the expansion member between the clamp body and the clamp cap and then compress the elastic body to the final compression position.

Further, it is preferable if the clamp body 13 and the clamp cap 15 can be smoothly moved along the conductor. For this purpose, when interposing the expansion member 50 between the clamp body 13 and the clamp cap 15, it is necessary to set the inner diameter of the conductor gripping grooves 17 and 19 of the clamp body 13 and the clamp cap 15 larger than the outer diameter of the conductor 11. As a measure for this, the method is adopted of adjusting the resiliency of the elastic body so that the elastic body can be further compressed by interposing the expansion member 50 even in a state where the elastic body is compressed up to the final compression position. Further, there is the method of effectively utilizing the opening between the clamp body 13 and the clamp cap 15 by positioning the elastic body closer to the conductor 11 side or increasing the distance between the hinge portion 20 and the conductor 11. Note that experiments show that it is preferable that the difference between the inner diameter of the conductor gripping grooves 17 and 19 of the clamp body 13 and the clamp cap 15 and the outer diameter of the conductor 11 be 3 mm or more in a state where the expansion member 50 is interposed.

Note that, in FIG. 8, 60 is a spacer frame. The other portions are the same as those of the above embodiment, so the same references are given and the explanations thereof are omitted.

By using the method of attaching the conductor clamp according to the present embodiment, the work of attaching the clamp body and the clamp cap to the conductor with a clearance from the outer periphery of the conductor can be carried out near the steel tower where there is little swing of the conductor, so the work can be carried out in a short time. Further, after the clamp body and the clamp cap are moved to the predetermined position on the outer periphery of the conductor, all that has to be done is have the clamp body and the clamp cap tightly grip the conductor, so there is the advantage that this work can also be carried out in a short time.

Second Embodiment

Figure 9:
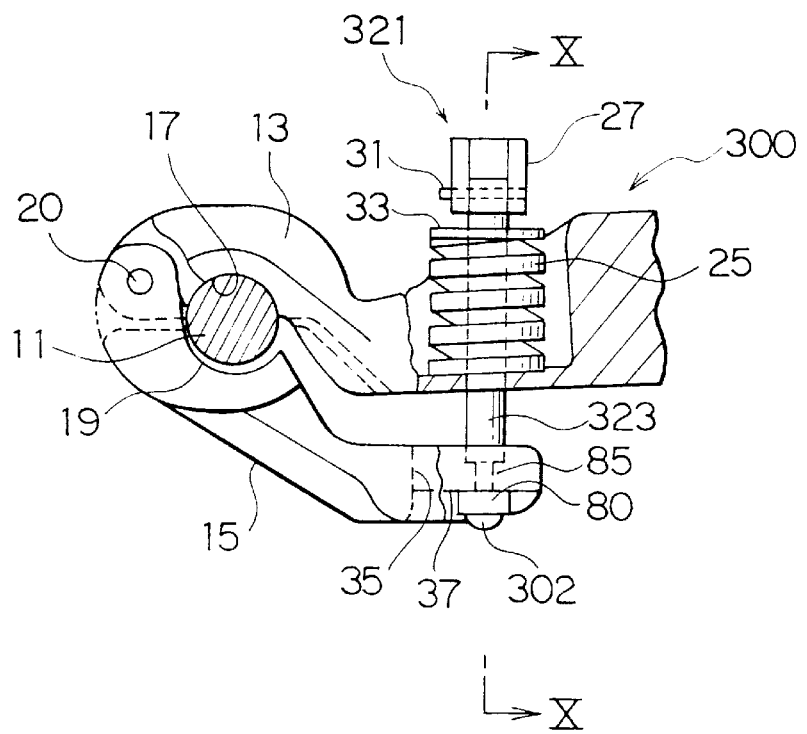
FIG. 9 is a partial sectional side view of a clamp according to another embodiment of the present invention.
Figure 10:
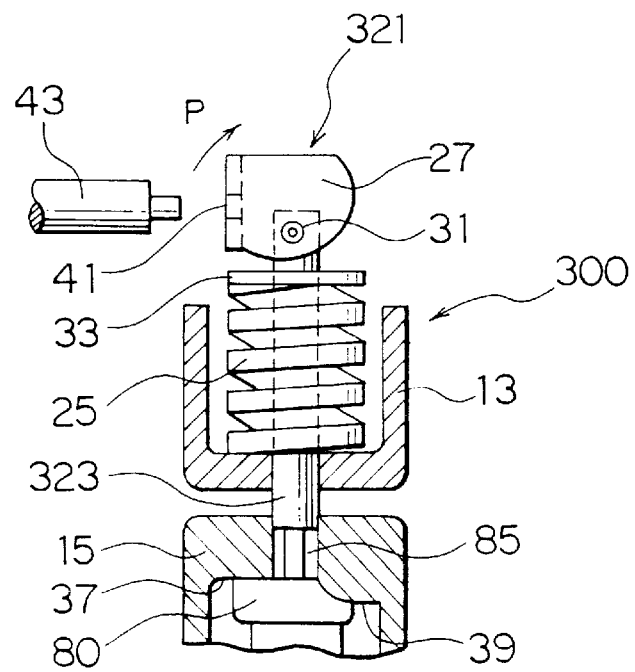
FIG. 10 is a sectional view of the principal parts taken along a line X—X shown in FIG. 9.
Figure 11:
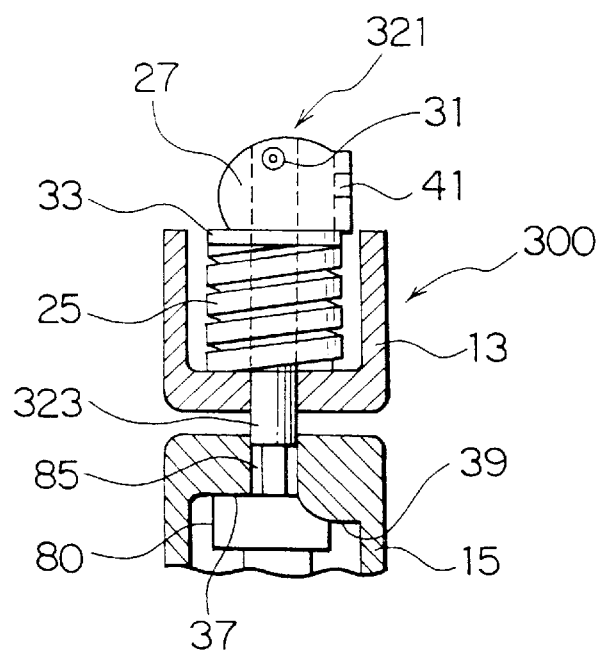
FIG. 11 is a sectional view in a similar direction to that of FIG. 10, but in which the pivot position of the cam is different.
Figure 12:
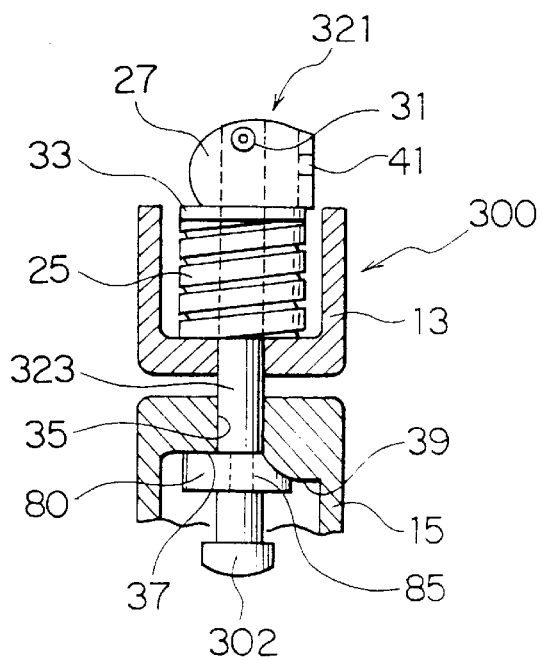
FIG. 12 is a sectional view in a similar direction to that of FIG. 11, but in which the position of the stopper member in the axial direction is different.

As shown in FIGS. 9 to 12, the conductor clamp 300 according to the second embodiment has a different structure of the fastening mechanism 321 from that of the above first embodiment. In the present embodiment, the length of the fastening rod 323 is made longer than the length of the rod 23 used in the clamp 200 of the above first embodiment. In addition, as shown in FIG. 11, the coil spring 25 is not compressed just by rotating the eccentric cam 27 to the pivot position compressing the coil spring. Further, in the present embodiment, at the lower end of the fastening rod 323, a stopper member 80 is attached so that it can move in the axial direction on the outer periphery of the fastening rod 323.

Figure 13:
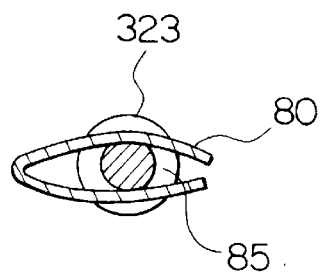
FIG. 13 is a lateral sectional view of the stopper member.

The stopper member 80 is formed by a spring material of a U-shaped cross-section as shown in FIG. 13. Accordingly, the stopper member 80 fastens the fastening rod 323 in the diametrical direction. To prevent this stopper member 80 from dropping off from the lower end of the rod 323, a stopper ring 302 is formed on the lower end of the rod 323. A groove 85 with which the stopper member 80 can be engaged is formed in the outer periphery of the rod 323 located a predetermined distance above the stopper ring 302. It is also possible to continuously form this groove 85 over the outer periphery of the rod 323 and possible to form the same only at one part of the outer periphery. This groove is for bringing the coil spring 25 into the compressed state by the engagement of the stopper member 80 so that it cannot move in the axial direction. Of course, the position where the groove 85 is formed can be made one enabling the coil spring 25 to be held in the compressed state.

Further, in order the prevent the rotation of this stopper member 80, the stopper member 80 is designed to be caught by the stopper projection 37 formed at the step portion 37 of the cap 15.

The rest of the structure of the clamp 300 according to the present embodiment is the same as the structure of the clamp 200 according to the above first embodiment. The same references are given to the same members and explanations thereof will be partially omitted.

Next, an explanation will be made of the method of attaching the conductor clamp 300 according to the present embodiment. First, the following work is carried out near the steel tower 204 shown in FIG. 7.

As shown in FIG. 9, the clamp body 13 and the clamp cap 15 are used to loosely grip the conductor 11 near the steel tower. Namely, the conductor is held in the conductor gripping grooves 17 and 19 of the clamp body 13 and the clamp cap 15, and the stopper member 80 attached to the front end (lower end in the figure) of the fastening rod 323 is fit between the step portion 37 of the clamp cap 15 and the stopper ring 302 of the rod 323. In this state, as shown in FIG. 9 and FIG. 10, the eccentric cam 27 is not rotated in the direction compressing the coil spring 25.

Next, as shown in FIG. 10, the operating rod 43 is inserted into the hole 41 of the eccentric cam 27 and turned 180 degrees in the direction indicated by the arrow P.

In this way, as shown in FIG. 11, the coil spring 25 is not compressed just by rotating the eccentric cam 27 in the direction compressing the coil spring 25. Namely, since the length of the fastening rod 323 is great, even if the eccentric cam 27 is rotated to the pivot position of the compression state, the coil spring 25 will not be compressed.

After the above work is ended, the clamp body 13 and the clamp cap 15 are moved along the conductor 11 to a predetermined position.

This work can be easily carried out by having a person riding on the aerial cab 208 shown in FIG. 7 move the spacer 202 etc. shown in FIG. 6.

Note that to prevent scratches from being formed on the conductor 11 when moving the clamp body 13 and the clamp cap 15 along the conductor 11, as shown in FIG. 8, preferably a cylindrical protector 70 made of a hard plastic or the like is interposed between the conductor 11 and the clamp body 13 and the clamp cap 15.

After the clamp body 13 and the clamp cap 15 are moved on the conductor 11 to the predetermined position, the stopper member 80 is moved relatively upward in the axial direction along the outer periphery of the fastening rod 23 to position the stopper member 80 at the outer periphery of the groove 85. Note that, where a cylindrical protector 70 is interposed between the conductor 11 and the clamp body 13 and the clamp cap 15, the above work is carried out after removing this protector 70. By positioning the stopper member 80 at the outer periphery of the groove 85, the stopper member 80 will not slide in the axial direction on the outer periphery of the fastening rod 23, and the coil spring 25 can be held in the compressed state. When the coil spring 25 is compressed, the compressive resilience thereof causes the clamp body 13 and the clamp cap 15 to fasten the conductor 11 and the clamp 300 will no longer move on the conductor 11.

Figure 14:
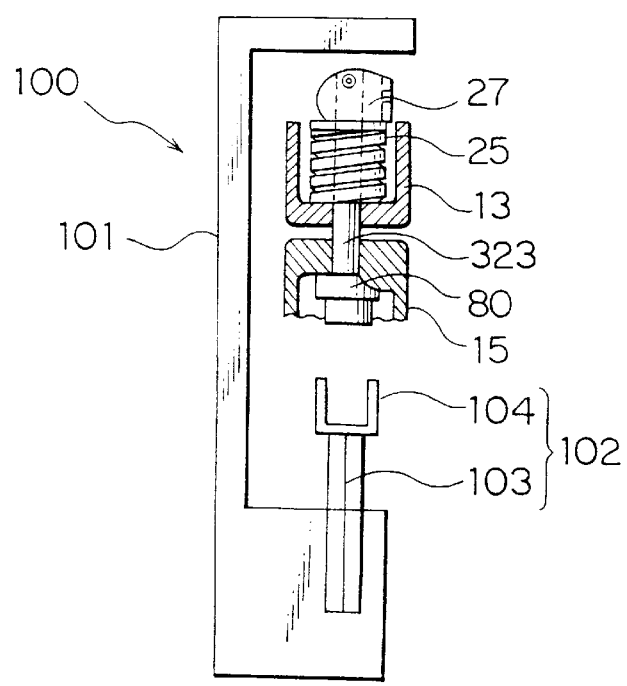
FIG. 14 is a schematic view of an example of a tool for attaching the clamp shown FIGS. 9 and 10.

Note that, it is possible to manually perform the work of moving the stopper member 80 relatively upward along the outer periphery of the fastening rod 23, but it is also possible to perform the same by using a pressing tool 100 as shown in FIG. 14.

Namely, the pressing tool 100 shown in FIG. 14 has a schematically U-shaped body 101 and a pressing portion 102 provided at the bottom of the same. The pressing portion 102 is constituted by a hydraulic cylinder 103 and a pressing material 104 attached to the front end of the hydraulic cylinder 103.

To move the stopper member 80 to above the fastening rod 323 by using this pressing tool 100, first the U-shaped body 101 is attached at the predetermined position, then the hydraulic cylinder 103 is operated to press the stopper member 80 by the pressing material 104 attached to the front end of the hydraulic cylinder 103.

Note that it is also possible to use an electric motor or a hydraulic motor in place of the hydraulic cylinder.

Figure 15:
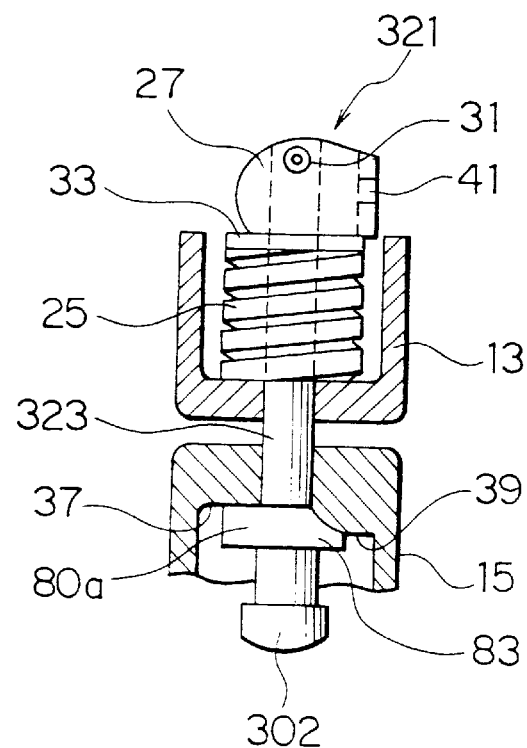
FIG. 15 is a sectional view of the principal parts of a clamp according to still another embodiment of the present invention.
Figure 16:
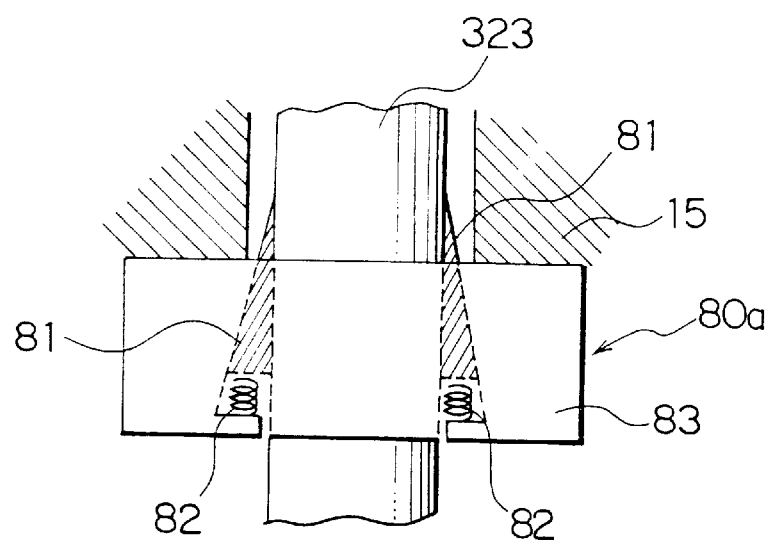
FIG. 16 is a sectional view of the principal parts of the stopper member shown in FIG. 15.
Figure 17:
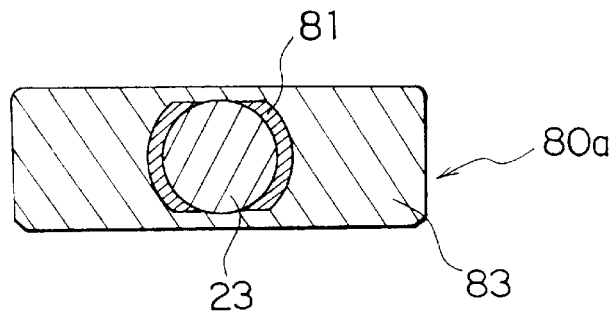
FIG. 17 is a lateral sectional view of the principal parts of the stopper member shown in FIG. 16.

FIGS. 15 to 17 show a modification of the above embodiment, in which the shape of the stopper member is different from that of the above embodiment.

A stopper member 80a according to this embodiment is configured with a wedge piece 81 in contact with the outer periphery of the fastening rod 323 and a spring material 82 pressing the rear end of the wedge piece 81 accommodated in a stopper member body 83.

To compress the coil spring 25 by using this stopper member 80a, one merely has to move the stopper member body 83 upward in the axial direction along the outer periphery of the fastening rod 323. Namely, when the stopper member body 83 is moved upward in the axial direction along the outer periphery of the fastening rod 323, the wedge piece 81 and the spring material 82 move to above the fastening rod 323 along with this. After the stopper member body 83 is moved to the predetermined position, the clamp cap 15 engages with the upper surface of the stopper member body 83 and the clamp cap 15 presses the stopper member body 83 downward. Then, the wedge piece 81 comes into close contact with the outer periphery of the fastening rod 323, whereafter the stopper member body 83 will no longer move downward.

When using such a wedge piece 81, the groove 85 of the fastening rod 323 as shown in the above embodiment becomes unnecessary.

Figure 18:
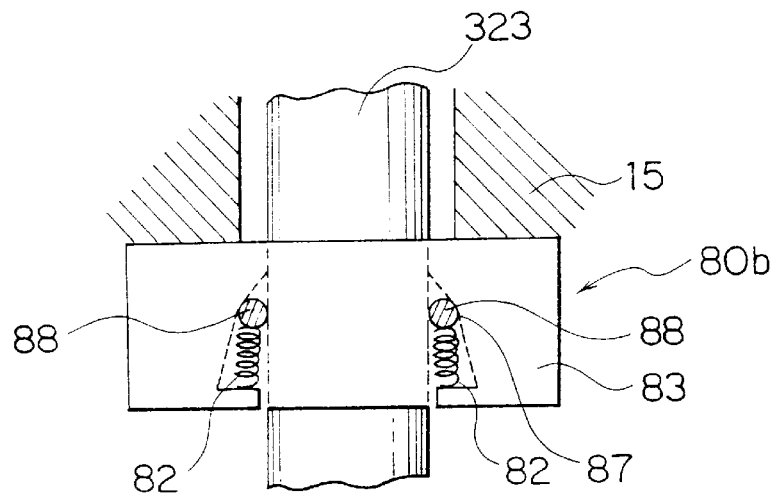
FIG. 18 is a sectional view of the principal parts of the stopper member used in a clamp according to still another embodiment of the present invention.
Figure 19:
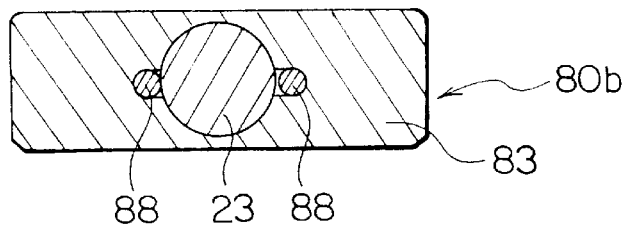
FIG. 19 is a lateral sectional view of the stopper member shown in FIG. 18.
Figure 20:
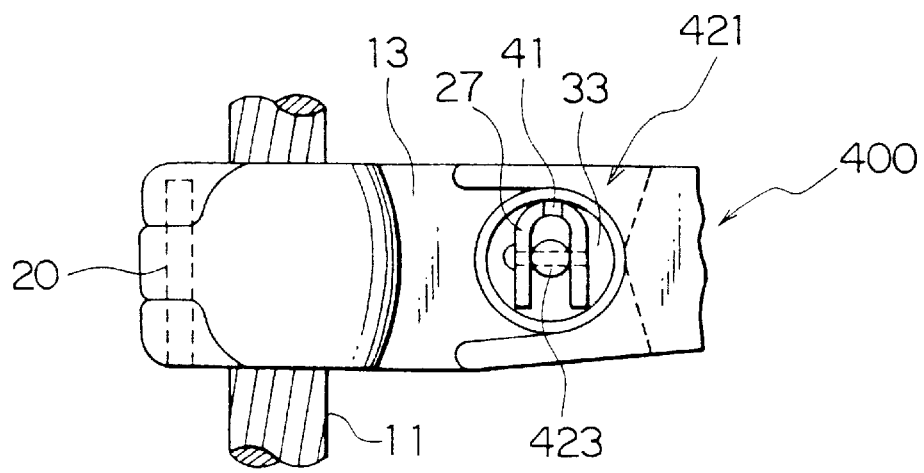
FIG. 20 is a plan view of the principal parts of a clamp according to still another embodiment of the present invention.
Figure 21:
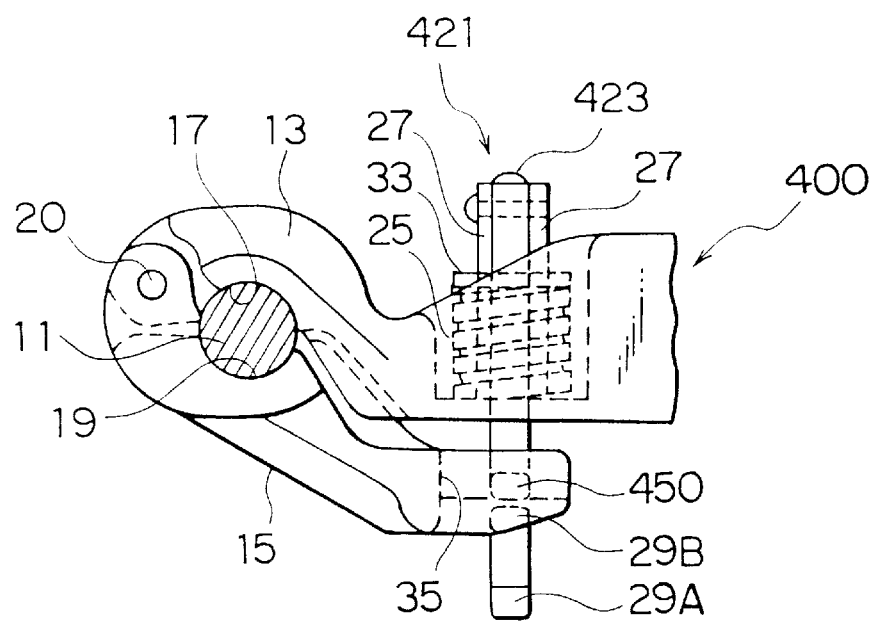
FIG. 21 is a front view of the principal parts of the clamp of FIG. 20.

FIG. 18 and FIG. 19 show still another embodiment of the conductor clamp of the present invention. The difference from the above embodiment resides in that a two-step tapered groove 87 is provided inside the stopper member body 83 constituting the stopper member 80b and a spherical body 88 serving as the modification of the wedge piece and a spring material 82 are inserted into this groove 87. In this state, the spherical body 88 performs a wedge action, comes into contact with the outer periphery of the fastening rod 323, and holds the coil spring 25 in the compressed state.

Note that, in the same way as mentioned above, the conductor clamp according to the present invention is not limited to that in the above embodiment. For example, it is also possible to use a rubbery elastic body, a plate spring, etc. in place of the coil spring. Further, the shape of the fastening member for compressing the elastic body is not particularly limited. For example, it is not necessary to use an eccentric cam.

Further, it is preferable if the clamp body 13 and the clamp cap 15 can be smoothly moved on the conductor 11. For this purpose, when loosely gripping the conductor by the clamp body 13 and the clamp cap 15, it is necessary to make the inner diameter of the conductor gripping grooves 17 and 19 of the clamp body 13 and the clamp cap 15 considerably larger than the outer diameter of the conductor 11. As the measure for this, the method can be adopted of lengthening the fastening rod 23 so that the degree of opening is further enlarged by the weight of the clamp cap 15. Further, there are a method of positioning the coil spring 25 close to the conductor 11 side, the method of effectively utilizing the opening between the clamp body 13 and the clamp cap 15 by increasing the distance between the hinge portion 20 and the conductor 11, etc.

Note that experiments show that the difference between the inner diameter of the conductor gripping grooves 17 and 19 of the clamp body 13 and the clamp cap 15 and the outer diameter of the conductor 11 is preferably 3 mm or more.

Further, of course, the conductor clamp used in the method of attachment of a conductor clamp of the present invention is not limited to that in the above embodiments.

Third Embodiment

When compared with the conductor clamp 200 according to the above first embodiment, the conductor clamp 400 according to the third embodiment has a fastening mechanism 421 different in structure from that of the above first embodiment. In the following explanation, the same references are given to members the same as those of the conductor clamp 200 according to the above first embodiment and explanations thereof are omitted. The different portions will be mainly explained.

As shown in FIGS. 20 to 23, in the present embodiment, at the lower end of the fastening rod 423 in the axial direction, two engagement projections 29A and 29B are formed. A stopper member 450 with which the engagement projections 29A and 29B engage is provided on the clamp body 13 or the clamp cap 15.

Namely, the engagement portions 29A and 29B respectively provided in the axial direction of the lower end of the fastening rod 423 are T-shaped. The number of the engagement portions 29A and 29B in the present embodiment is two, but is not particularly limited and can be three or more as well.

Figure 22:
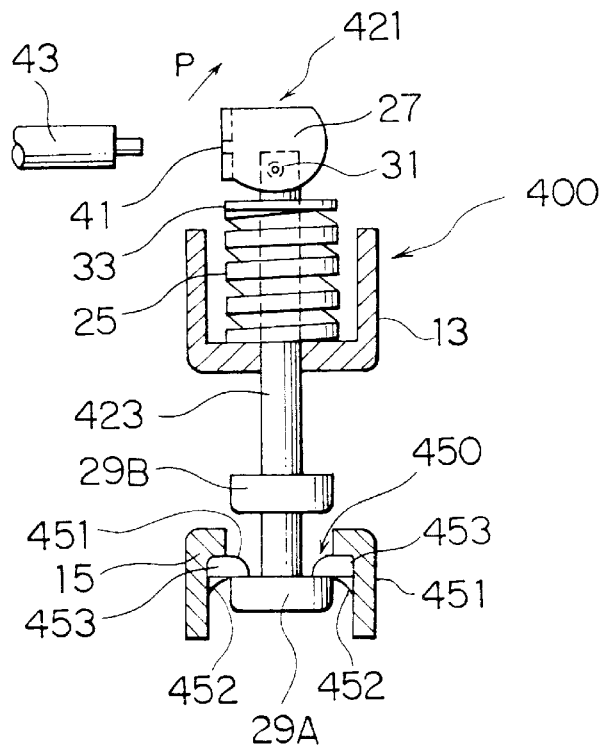
FIGS. 22 and 23 are schematic sectional views of the state of use of the clamp shown in FIGS. 20 and 21.
Figure 23:
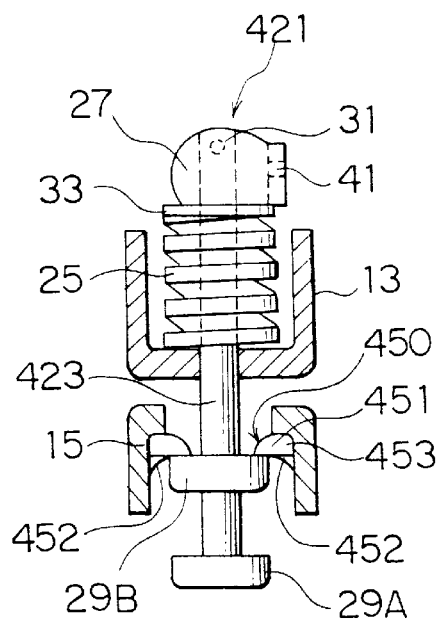
Figure 24:
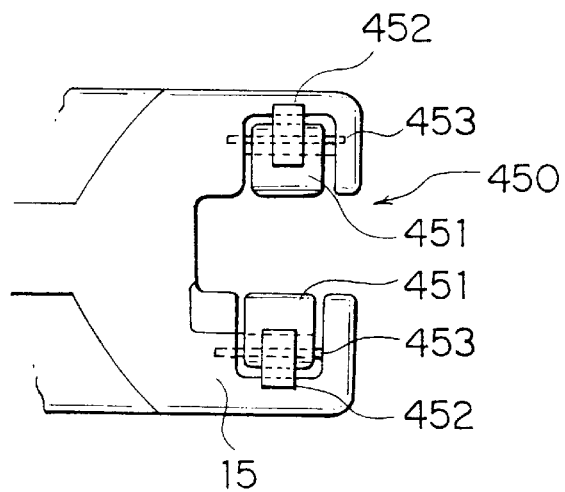
FIG. 24 is a plan view of the principal parts of the stopper member shown in FIGS. 20 to 23.

On the other hand, the stopper member 450 provided at the clamp cap 15 is comprised of a lock piece 451 and a plate spring 452 which maintains the lock piece 451 in the horizontal state as shown in FIGS. 22 to 24.

The lock piece 451 is attached to the clamp cap 15 by a pin 453. The upper surface thereof is engaged with the inner surface of the clamp cap 15. The plate spring 452 is engaged with the lower surface.

Accordingly, the stopper member 450 pivots downward about the pin 453 when the upper surface is pushed by the engagement portions 29A and 29B of the fastening rod 423 and returns to the original horizontal state by the resilience of the plate spring 452 when the engagement portions 29A and 29B pass. At this time, the upper surfaces of the engagement portions 29A and 29B engage with the lower surface of the stopper member 450.

Next, an explanation will be made of the method of attaching the conductor clamp 400 having the above structure to the conductor.

First, the following work is carried out near the steel tower 204 shown in FIG. 7.

As shown in FIG. 22, the first engagement portion 29A of the fastening rod 423 is engaged with the pivot engaging body 50. This work can be easily carried out by pushing the first engagement portion 29A of the fastening rod 423 into the stopper member 450.

Next, the eccentric cam 27 is turned in the direction indicated by the arrow P to the pivot position bringing the coil spring 25 into the compressed state. In this state, the coil spring 25 is not fully compressed and the clamp body 13 and the clamp cap 15 loosely grip the conductor 11. The difference between the inner diameter of the clamp body 13 and the clamp cap 15 and the outer diameter of the conductor 11 is preferably 3 mm or more. Next, the clamp body 13 and the clamp cap 15 are moved along the conductor 11 to a predetermined position between the steel towers.

This work can be easily carried out by having a person riding on the aerial cab 208 shown in FIG. 7 move the spacer 202 etc. shown in FIG. 6.

Note that in order to prevent scratches from being made on the conductor 11 when moving the clamp body 13 and the clamp cap 15 along the conductor 11, preferably a cylindrical protector 70 made of a hard plastic etc. shown in FIG. 8 is interposed between the conductor 11 and the clamp body 13 and the clamp cap 15.

After the clamp body 13 and the clamp cap 15 are moved along the conductor 11 to the predetermined position, as shown in FIG. 23, the second engagement portion 29B of the fastening rod 423 is engaged with the stopper member 450. This work can be easily carried out by pushing the second engagement portion 29B of the fastening rod 423 into the pivot engaging body 50.

By engaging the second engagement portion 29B of the fastening rod 423 with the stopper member 450, the clamp body 13 and the clamp cap 15 tightly grip the conductor 11.

Figure 25:
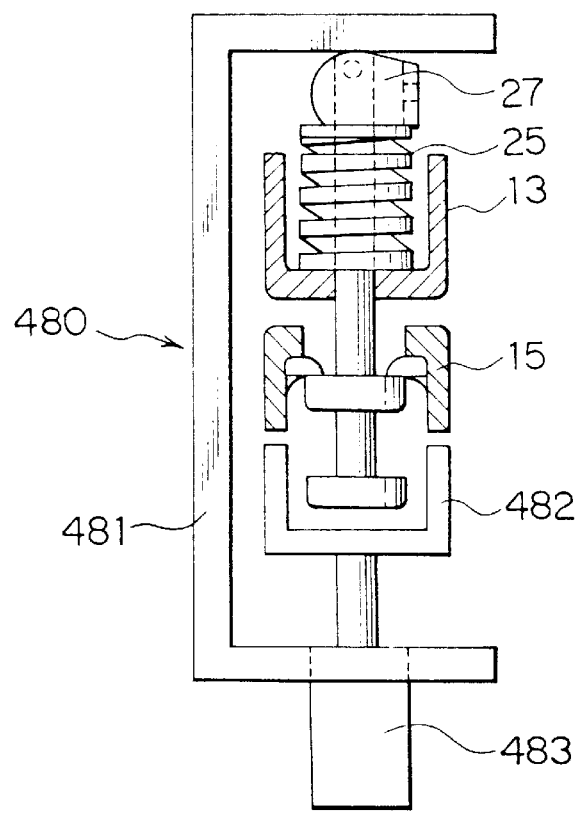
FIG. 25 is a schematic view of an example of the tool used for the operation of the clamp shown in FIGS. 20 to 23.

Note that it is possible to manually perform the work of engaging the second engagement portion 29B of the fastening rod 423 with the stopper member 450, but it is also possible to use the compression tool 480 as shown in FIG. 25. This compression tool 480 is constituted by a compression member 482 which is arranged inside a U-shaped frame 481 and engaged with the lower wall of the clamp cap 15 and by a hydraulic cylinder 483 vertically moving the compression member 482. In order to engage the second engagement portion 29B of the fastening rod 423 with the stopper member 450 by using this compression tool 480, the upper portion of the U-shaped frame 481 is engaged with the eccentric cam 27, the compression member 482 is made to abut against the bottom of the clamp cap 15, and the cylinder 483 is driven. By this, the clamp body 13 and the clamp cap 15 can be easily fastened.

Note that, in the conductor clamp 400 according to the present invention, it is also possible not to provide a coil spring or eccentric cam but directly fasten the clamp body 13 and the clamp cap 15 by the fastening rod 423. Further, it is also possible even only one engagement portion is provided at the fastening rod 423. If there is only one engagement portion in this way, there is an advantage that the work of fastening the clamp body 13 and the clamp cap 15 can be more easily carried out.

Further, the structure of the stopper member 450 is not particularly limited. It is sufficient if the engagement projection can be engaged with after the engagement projection is passed. Further, it is also possible to provide the stopper member 450 on the clamp body side.

Fourth Embodiment

When compared with the conductor clamp 200 according to the above first embodiment, the conductor clamp 500 according to the present embodiment has a structure of the fastening mechanism 521 different from that of the above first embodiment. In the following explanation, the same references are given to members the same as those of the conductor clamp 200 according to the above first embodiment and the explanations thereof will be omitted. Only different portions will be mainly explained.

Figure 26:
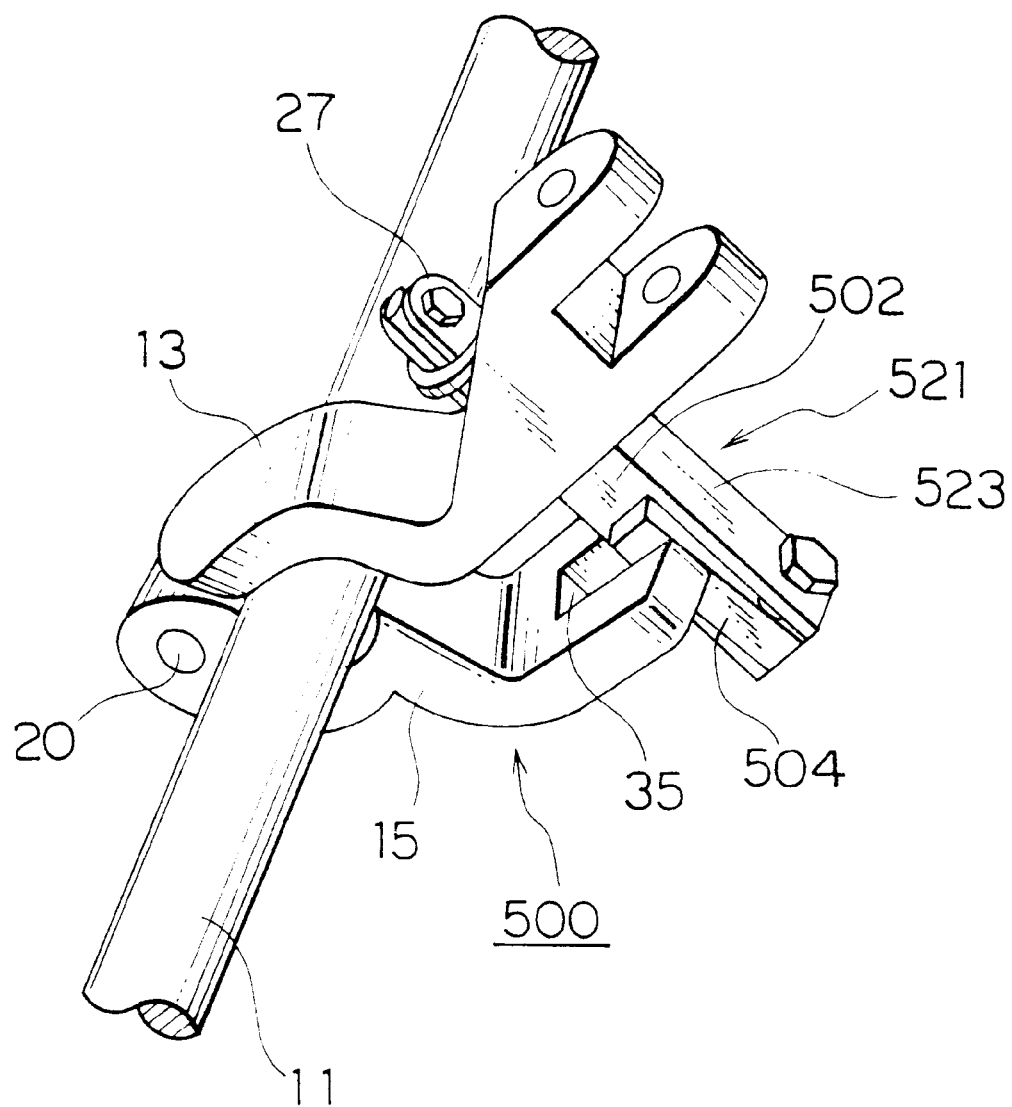
FIG. 26 is a perspective view of the state of use of a clamp according to a still other embodiment of the present invention.
Figure 27:
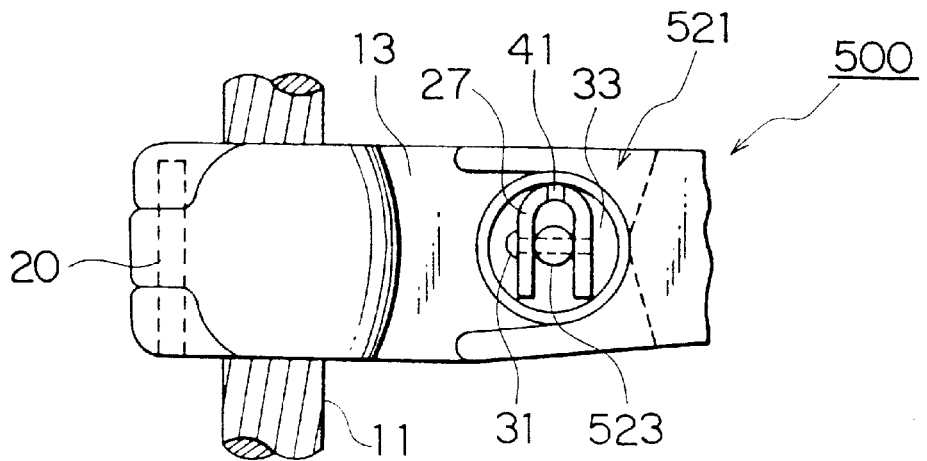
FIG. 27 is a plan view of the principal parts of the clamp shown in FIG. 26.
Figure 28:
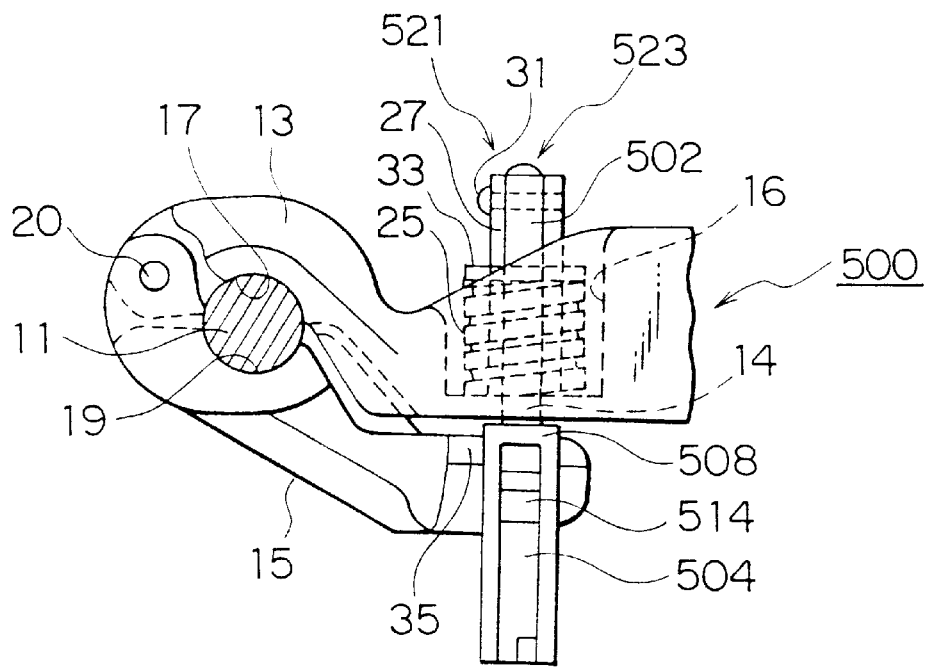
FIG. 28 is a partial sectional front view of the clamp shown in FIG. 26.

As shown in FIGS. 26 to 28, in the present embodiment, a fastening rod 523 is constituted by a rod body portion 502 and a clamp cap stopper piece 504.

The body portion 502 is constituted by, as shown in FIGS. 28, 29A, 29B, 30A, and 30B, an upper rod 506 in the form of a column penetrating through the clamp body 13 and a U-shaped attachment portion 508 formed in the lower portion of the upper rod 506 integrally with this.

Figure 32:
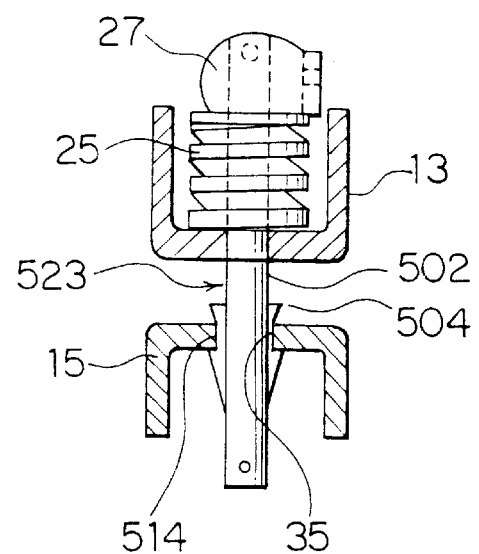
Figure 34:
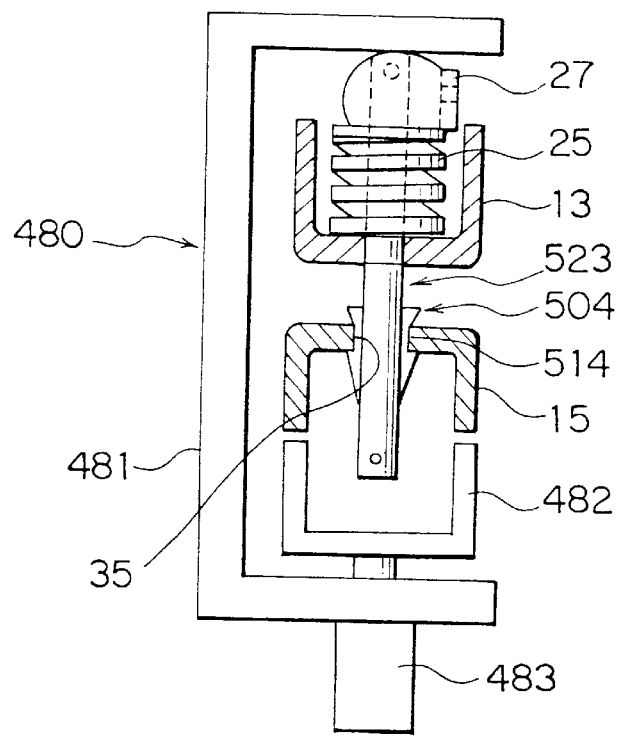
FIG. 34 is a schematic view of an example of the tool used for the operation of the clamp shown in FIG. 26.

On the other hand, the clamp stopper piece 504 has a pair of moveable pieces 510 and 510 as shown in FIGS. 28, 29A, 29B, 30C, and 30D. These moveable pieces 510 and 510 are pivotably connected in their base portions by the pin 516. A spring 512 is mounted between these moveable pieces 510 so that the front end side of a pair of moveable pieces 510 is always opened. In the present embodiment, in the respective moveable pieces 510, grooves 514 for temporary stopping are respectively formed. An elongated hole 35 of the cap 15 can be freely temporarily engaged with these temporary-stopping grooves 514 as shown in FIG. 32 and FIG. 34. Note that, in the present invention, there may be a case where it is not always necessary to provide these temporary stopping grooves 514 on the outside of the moveable piece 510.

Figure 29A:
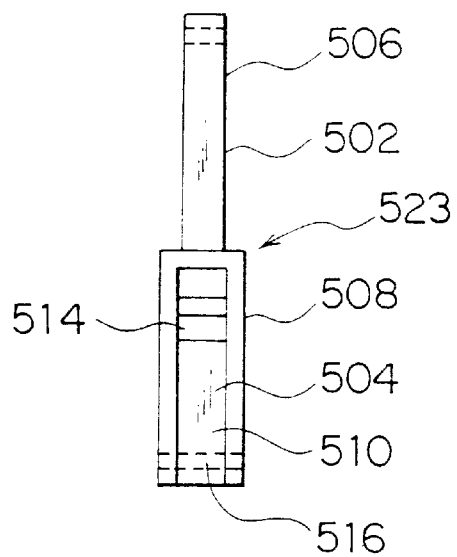
FIG. 29A is a front view of the fastening rod shown in FIG. 26.
Figure 29B:
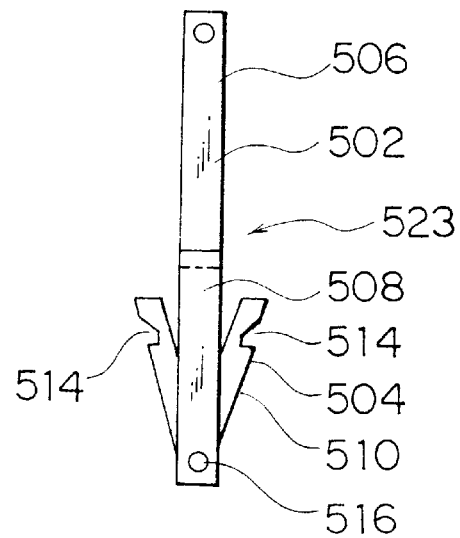
FIG. 29B is a side view of that rod.
Figure 30A:
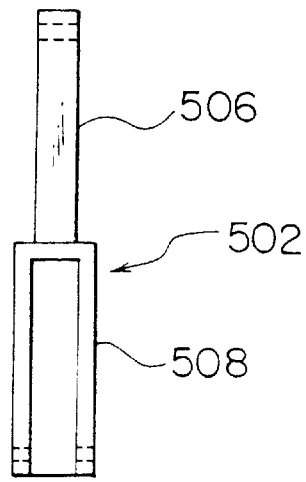
FIG. 30A is a front view of the rod body of the fastening rod shown in FIG. 26.
Figure 30B:
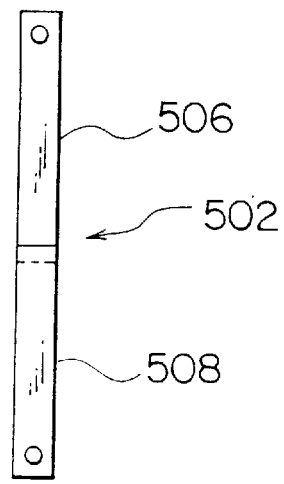
FIG. 30B is a side view of that rod body.
Figure 30C:
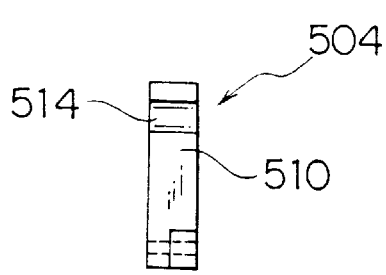
FIG. 30C is a front view of a clamp cap stopper piece of the fastening rod shown in FIG. 26.
Figure 30D:
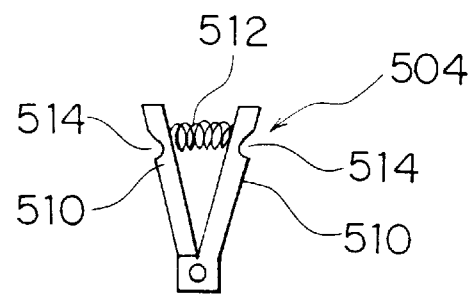
FIG. 30D is a side view of that clamp cap stopper piece.

The body portion 502 and the clamp cap stopper piece 504 formed as described above are combined by the pin 516 as shown in FIGS. 29A and 29B. Namely, the clamp cap stopper piece 504 is arranged in the inside of the attachment portion 508 of the body portion 502. The arrangement is made so that the front end of the moveable piece 510 is always opened.

In the fastening rod 523 in which the clamp cap stopper piece 504 is provided as described above, as shown in FIGS. 26, 27 and 28, the upper rod 506 of the body portion 502 is attached to the clamp body 13 so that it penetrates through the through hole 14 of the clamp body 13.

On the front end (upper end) of the upper rod 506 through which the clamp body 13 is penetrated, the eccentric cam 27 is rotatably attached by the shaft pin 31. Further, in the internal portion of the depression 16 formed in the clamp body 13, the coil spring 25 and the washer 33 are arranged at the outer periphery of the upper rod 506 between the eccentric cam 27 and the clamp body 13.

The above FIGS. 27 and 28 show a state where the conductor 11 is tightly gripped by the clamp body 13 and the clamp cap 15, the coil spring 25 is in the compressed state, and the clamp cap 15 is engaged with the clamp stopper piece 504 in the expanded state.

Next, an explanation will be made of the method of attaching the conductor clamp 500 having the above structure to the conductor 11.

Figure 31:
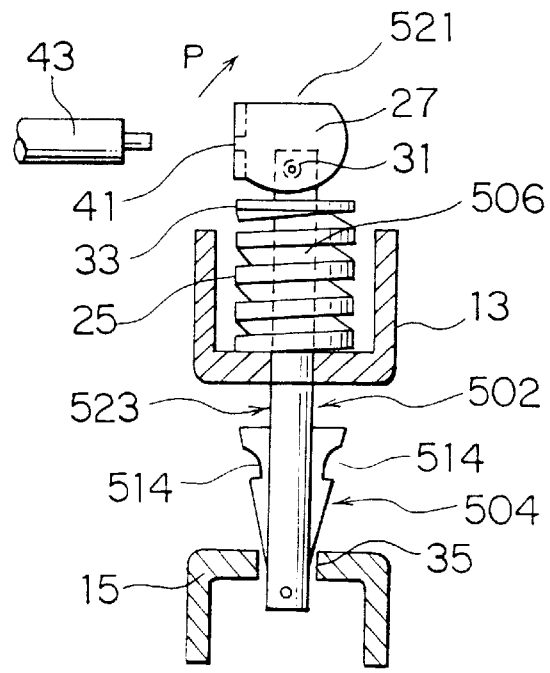
FIGS. 31 to 33 are sectional views of principal parts showing the method of use of the clamp shown in FIG. 26.

First, at the shipment from the factory or near the steel tower, as in FIG. 31, the operating rod 43 is inserted into the hole 41 of the eccentric cam 27 and is rotated by 180 degrees in the direction indicated by the arrow P. By this, the coil spring 25 becomes compressable between the clamp body 13 and the washer 41. In this state, the clamp cap stopper piece 504 of the fastening rod 523 is spread outward.

Next, near the steel tower 204 shown in FIG. 7, the clamp body 13 and the clamp cap 15 are positioned so as to surround the conductor 11 and pivoted so as to close the clamp cap 15. Then, as shown in FIG. 32, the elongated hole 35 (including the recess) formed on the opening end (front end) of the clamp cap 15 slidably moves on the outer surface of the clamp cap stopper piece 504. The clamp cap stopper piece 504 is pulled inwardly accompanied with this. The pivoting of the clamp cap 15 stops at the point of time when the elongated hole 35 is engaged with the temporary stopping groove 514 of the clamp cap stopper piece 504 as shown in FIG. 32. In such a state, the clamp cap stopper piece 504 is between the maximum spread position and the minimum pulled-in position. Then, the clamp cap stopper piece 504 in this state pushes against the inner edge of the elongated hole 35 of the clamp cap 15 so as to maintain the initial spread state by the resilience of the spring shown in FIG. 30D.

Since the inner edge of the elongated hole 35 of the clamp cap 15 is engaged with the temporary stopping groove 514 of the clamp cap stopper piece 504 and the clamp cap stopper piece 504 pushes against the inner edge of the elongated hole 35 of the clamp cap 15 in this way, the clamp cap 15 is temporarily held by the clamp cap stopper piece 504. In a state where the clamp cap 15 is temporarily held by the clamp cap stopper piece 504, the clamp body 13 and the clamp cap 15 surround the outer periphery of the conductor 11 and a clearance is provided from the outer periphery of the conductor 11.

After the work as described above is ended, the clamp body 13 and the clamp cap 15 are moved along the conductor 11 in the longitudinal direction thereof to the predetermined position between the steel towers. This work can be easily carried out by having a person riding on the aerial cab 208 shown in FIG. 7 move the spacer 202 etc. shown in FIG. 6 connected to the clamp body 13.

Note that to prevent scratches from being formed on the conductor 11 when moving the clamp body 13 and the clamp cap 15 along the conductor 11, as shown in FIG. 8, preferably a cylindrical protector 70 made of a hard plastic or the like is interposed between the conductor 11 and the clamp body 13 and the clamp cap 15.

Figure 33:
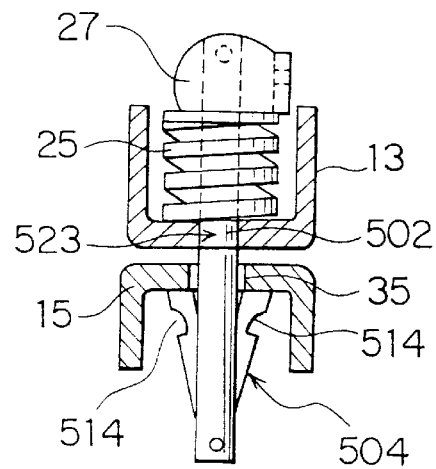

Next, after the clamp body 13 and the clamp cap 15 are located at the predetermined position in the longitudinal direction of the conductor 11, as shown in FIG. 33, the clamp cap 15 is pivoted in a direction in which the clamp cap 15 is further fastened with respect to the body 13. Then, the inner edge of the elongated hole 35 of the clamp cap 15 detaches from the top of the temporary stopping groove 514 of the clamp cap stopper piece 504 and the cap 15 further moves upward. At the point of time when it rides over the upper end of the stopper piece 504, the clamp cap stopper piece 504 is in the initial maximum spread state as shown in FIG. 33.

The clamp cap stopper piece 504 exhibiting the maximum spread state is engaged with the clamp cap 15 so that the clamp cap 15 will not be pulled out of the clamp body 13. In this state, a compressive resilience has been generated in the coil spring 25. The conductor 11 is tightly gripped by the clamp body 13 and the clamp cap 15 by utilizing the compressive resilience.

Note that while it is possible to manually perform the work of pivoting the clamp cap 15 with respect to the body 13 and tightly gripping the conductor 11 by the clamp body 13 and the clamp cap 15, it is also possible to use a compression tool 480 as shown in FIG. 34. This compression tool 480 has the same structure as that of the tool 480 shown in FIG. 25, so the explanation thereof will be omitted.

As described above, in the conductor clamp 500 according to the present embodiment, the method of surrounding the outer periphery of the conductor near the steel tower, forming a clearance between the clamp body and the clamp cap and the outer periphery of the conductor and attaching the clamp body and the clamp cap, moving the clamp body and the clamp cap along the conductor to a predetermined position between the steel towers, and finally gripping the conductor by the clamp body and the clamp cap can be easily realized.

What is claimed is:

1. A clamp for an overhead line comprising:

a clamp body in which a first gripping groove for gripping the overhead line is formed;

a clamp cap in which a second gripping groove for gripping the overhead line is formed and which is pivotably attached to the clamp body via a hinge means;

a fastening means for fastening the clamp body and clamp cap in a final fastening state for affixing the overhead line between the first and second gripping grooves unable to move in an axial direction, the clamp body and clamp cap being in a final fastening state pivot position when the fastening means is in said final fastening position, said fastening means having a fastening rod for connecting the clamp body and clamp cap, an elastic member for imparting an elastic force in a direction for fastening the clamp body and clamp cap, and a cam means for switching between a state where the fastening force by the elastic member acts in a direction for fastening the clamp body and the clamp cap and a state where that fastening force is released; and an expansion means away from contact with the overhead line for causing the clamp cap to stop at a position where it is forcibly kept open by a predetermined clearance from the clamp body against a fastening force given by the fastening means so that the clamp body and the clamp cap are not located at the final fastening state pivot position and in addition so that a clearance is formed between the first and second gripping grooves and the overhead line to permit axial movement therebetween.

2. The clamp for an overhead line as set forth in claim 1, wherein the expansion means is inserted between the clamp body and the clamp cap in a state where the fastening force by the elastic member acts in the direction for fastening the clamp body and clamp cap.

3. The clamp for an overhead line as set forth in claim 2, wherein the expansion means is a wedge.

4. A clamp for an overhead line comprising:

a clamp body in which a first gripping groove for gripping the overhead line is formed;

a clamp cap in which a second gripping groove for gripping the overhead line is formed and which is pivotably attached to the clamp body via a hinge means;

a fastening means for fastening the clamp body and clamp cap in a final fastening state for affixing the overhead line between the first and second gripping grooves unable to move in an axial direction, the clamp body and clamp cap being in a final fastening state pivot position when said fastening means is in said final fastening position, said fastening means having a fastening rod for connecting the clamp body and clamp cap, an elastic member for imparting an elastic force in a direction for fastening the clamp body and clamp cap, and a cam means for switching between a state where the fastening force by the elastic member acts in a direction for fastening the clamp body and the clamp cap and a state where that fastening force is released; and a stopper means away from contact with the overhead line for temporarily holding the clamp cap with respect to the clamp body at a temporary stopping pivot position so that the clamp body and clamp cap are not located at the final fastening state pivot position and in addition so that a clearance is formed between the first and second gripping grooves and the overhead line permitting axial movement therebetween.

5. The clamp for an overhead line as set forth in claim 4, wherein the stopper means is attached to the outer periphery of the fastening rod;

a groove in which the stopper means can be engaged so that it cannot move in the axial direction is formed at the outer periphery of the fastening rod; and the clamp body and clamp cap are affixed at the pivot position of the final fastening state in a state where the stopper means is engaged with the groove.

6. The clamp for an overhead line as set forth in claim 5, wherein the stopper means is constituted by a spring plate having a U-shape.

7. The clamp for an overhead line as set forth in claim 4, wherein the stopper means has a stopper member body attached to the outer periphery of the fastening rod, a wedge piece attached to the inner periphery of the stopper member body, and a spring for pressing this wedge piece in the axial direction of the fastening rod;

the stopper member body is attached to the outer periphery of the fastening rod so that it can move in the first axial direction and in addition cannot move in a second axial direction which is a reverse direction to the first direction without any tool; and the stopper member body is moved in the first axial direction along the outer periphery of the fastening rod so that the clamp body and clamp cap are affixed at the pivot position of the final fastening state.

8. The clamp for an overhead line as set forth in claim 4, wherein the stopper means has a stopper member provided in the clamp body or clamp cap so that the stopper member engages with an engagement piece provided on the outer periphery of the fastening rod in a manner allowing the clamp body and clamp cap to pivot relative to each other along the fastening rod in the first direction giving the pivot position of the final fastening state but limiting the relative pivoting in the second direction which is the reverse direction to the first direction and the clamp body and clamp cap are affixed to give the pivot position of the final fastening state.

9. The clamp for an overhead line according to claim 4, wherein the stopper means has a stopper piece provided so that a spring force is given to the fastening rod in a spreading direction;

the stopper piece is pulled in when the clamp body and clamp cap are pivoted relative to each other in the first direction giving the pivot position of the final fastening state along the stopper piece in a state where either the clamp body or clamp cap is in contact with the stopper piece of the fastening rod; the stopper piece spreads outward when the clamp body and clamp cap are pivoted relative to each other in the first direction over the stopper piece; and the stopper piece is engaged with the clamp body or the clamp cap and the clamp body and clamp cap are affixed to give the pivot position of the final fastening state.

10. The clamp for an overhead line as set forth in claim 9, wherein a temporary stopping groove is formed in the outer surface of the stopper piece.

* * * * *